(12) United States Patent
Lopes et al.

(10) Patent No.: US 7,493,405 B2
(45) Date of Patent: Feb. 17, 2009

(54) METHOD AND APPARATUS FOR TRANSMITTING DATA IN A RADIO COMMUNICATION SYSTEM

(75) Inventors: Luis Lopes, Swindon (GB); Davood Molkdar, Swindon (GB); Walter Featherstone, Swindon (GB)

(73) Assignee: Motorola, Inc., Schaumburg, IL (US)

( * ) Notice: Subject to any disclaimer, the term of this patent is extended or adjusted under 35 U.S.C. 154(b) by 688 days.

(21) Appl. No.: 10/495,082

(22) PCT Filed: Oct. 21, 2002

(86) PCT No.: PCT/EP02/11769

§ 371 (c)(1),
(2), (4) Date: May 5, 2004

(87) PCT Pub. No.: WO03/052995

PCT Pub. Date: Jun. 26, 2003

(65) Prior Publication Data

US 2004/0255040 A1    Dec. 16, 2004

(30) Foreign Application Priority Data

Dec. 15, 2001   (GB) ................................ 0130094.6

(51) Int. Cl.
*G06F 15/16* (2006.01)
(52) U.S. Cl. ............... 709/230; 709/231; 709/232; 709/233; 709/234; 709/235
(58) Field of Classification Search .......... 709/230–235
See application file for complete search history.

(56) References Cited

U.S. PATENT DOCUMENTS 5,414,796 A * 5/1995 Jacobs et al. ................. 704/221
6,163,577 A * 12/2000 Ekudden et al. ............. 375/242
6,259,917 B1 * 7/2001 Elzein ...................... 455/435.2
6,728,217 B1 * 4/2004 Amirijoo et al. ............. 370/252
6,999,430 B2 * 2/2006 Holtzman et al. ........... 370/328
7,095,719 B1 * 8/2006 Wilhelmsson et al. ....... 370/252
7,170,928 B1 * 1/2007 Horneman et al. .......... 375/225

(Continued)

FOREIGN PATENT DOCUMENTS

WO      WO 01/78489 A    10/2001

OTHER PUBLICATIONS

Balachandran K. et al: "A Proposal for EGPRS Radio Link Control Using Link Adaptation and Incremental Redundancy", Bell Labs Technical Journal, Wiley, CA, US, vol. 4, No. 3, Jul. 1999, pp. 19-36.

*Primary Examiner*—Nathan J Flynn
*Assistant Examiner*—Mohamed Wasel

(57) ABSTRACT

A method and apparatus for transmitting data in a radio communication system includes a data segmenter (203) segmenting data into data segments that are fed to a transmission encoder (205) which encodes them into transmission blocks having different energy per information bit levels. The transmission blocks are transmitter and feedback information is received from the remote radio station (216). An analysis processor (219) determines an analysis group that comprises at least two data segments having transmission blocks encoded with different energy per information bit levels. The analysis processor (219) further generates a performance distribution measure relating to the analysis group in response to the feedback information. A transmission controller (207) selects a transmission scheme to apply to subsequent data segments in response to the performance distribution measure.

18 Claims, 2 Drawing Sheets

U.S. PATENT DOCUMENTS

| | | | |
|---|---|---|---|
| 7,385,934 B2 * | 6/2008 | Uehara et al. | 370/252 |
| 2002/0104058 A1 * | 8/2002 | Rappaport | 714/784 |
| 2003/0161343 A1 * | 8/2003 | Ghosh | 370/465 |
| 2004/0255040 A1 * | 12/2004 | Lopes et al. | 709/230 |
| 2005/0190178 A1 * | 9/2005 | Holtzman et al. | 370/328 |
| 2005/0190718 A1 * | 9/2005 | Holzman et al. | 370/328 |

* cited by examiner

METHOD AND APPARATUS FOR TRANSMITTING DATA IN A RADIO COMMUNICATION SYSTEM

FIELD OF THE INVENTION

This invention relates to a method and apparatus for transmitting data.

BACKGROUND OF THE INVENTION

Transmission of data in radio communication systems such as mobile cellular communication systems have become widespread and in order to fully exploit the scarce radio resource, it has become increasingly important to control transmission such that data throughput is optimised In a cellular communication system each of the remote terminals (such as mobile stations, subscriber units, user terminals etc) communicates with typically a fixed base station. Communication from the remote terminal to the base station is known as uplink and communication from the base station to the remote terminal is known as downlink. The total coverage area of the system is divided into a number of separate cells, each predominantly covered by a single base station. The cells are typically geographically distinct with an overlapping coverage area with neighbouring cells. FIG. 1 illustrates a cellular communication system 100. In the system, a base station 101 communicates with a number of remote terminals 103 over radio channels 105. In the cellular system, the base station 101 covers users within a certain geographical area 107, whereas other geographical areas 109, 111 are covered by other base stations 113, 115.

As a remote terminal moves from the coverage area of one cell to the coverage area of another cell, the communication link will change from being between the remote terminal and the base station of the first cell, to being between the remote terminal and the base station of the second cell. This is known as a handover. Specifically, some cells may lie completely within the coverage of other larger cells.

All base stations are interconnected by a fixed network. This fixed network comprises communication lines, switches, interfaces to other communication networks and various controllers required for operating the network. The base station themselves may also be considered part of the network. A call from a remote terminal is routed through the fixed network to the destination specific for this call. If the call is between two remote terminals of the same communication system the call will be routed through the fixed network to the base station of the cell in which the other remote terminal currently is. A connection is thus established between the two serving cells through the fixed network. Alternatively, if the call is between a remote terminal and a telephone connected to the Public Switched Telephone Network (PSTN) the call is routed from the serving base station to the interface between the cellular mobile communication system and the PSTN. It is then routed from the interface to the telephone by the PSTN.

A cellular mobile communication system is allocated a frequency spectrum for the radio communication between the remote terminals and the base stations. This spectrum must be shared between all remote terminals simultaneously using the system.

One method of sharing this spectrum is by a technique known as Code Division Multiple Access (CDMA). In a Direct Sequence CDMA (DS-CDMA) communication system, the signals are prior to being transmitted multiplied by a high rate code whereby the signal is spread over a larger frequency spectrum. A narrowband signal is thus spread and transmitted as a wideband signal. At the receiver the original narrowband signal is regenerated by multiplication of the received signal with the same code. A signal spread by use of a different code will at the receiver not be de-spread but will remain a wide band signal. In the receiver the majority of interference caused by interfering signals received in the same frequency spectrum as the wanted signal can thus be removed by filtering. Consequently a plurality of remote terminals can be accommodated in the same wideband spectrum by allocating different codes for different remote terminals. Codes are chosen to minimise the interference caused between remote terminals typically by choosing orthogonal codes when possible. A further description of CDMA communication systems can be found in 'Spread Spectrum CDMA Systems for Wireless Communications', Glisic & Vucetic, Artech house Publishers, 1997, ISBN 0-89006-858-5. Examples of CDMA cellular communication systems are IS 95 standardised in North America and the Universal Mobile Telecommunication System (UMTS) currently under standardisation in Europe.

Traditional traffic in mobile cellular communication systems has been circuit switched voice data where a permanent link is set up between the communicating parties. In the future, it is envisaged that data communication will increase substantially and typically the requirements for a remote terminal to transmit data will not be continuous but will be at irregular intervals. Consequently it is inefficient to have a continuous link set up between users and instead a significant increase in packet based data traffic is expected, where the transmitting remote terminal seeks to transmit the data in discrete data packets when necessary. An example of a packet based system is General Packet Radio Service (GPRS) introduced to the Global System for Mobile communication (GSM). Further details on data packet systems can be found in 'Understanding data communications: from fundamentals to networking, 2nd ed.', John Wiley publishers, author Gilbert Held, 1997, ISBN 0-471-96820-X.

In such wireless packet data systems, retransmission schemes are used to ensure that data packets are received without errors. One such method is an automatic request (ARQ) scheme, where the receiver determines if any errors are received in the data packets, and if so requests retransmission of the packets in error.

ARQ mechanisms are thus employed to ensure error free message transfer between two entities. The receiving-end transmits a feedback message, referred to as ACK/NACK (ACKnowledge/Not ACKnowledge) message, to the transmitting-end to indicate the correct or incorrect reception of the transmitted packets. The ARQ mechanism allows the system to operate at a higher packet error rate referred to as Block Error Rate (BLER).

In a multi-rate packet data system, two types of ARQ techniques are envisaged. The first one is based on allocating a user with a code that matches its radio condition at a specified performance figure. This is called pure Link Adaptation (LA). The second method is based on allocating the highest code rate to a user but improving its link performance by code combining the corrupted packets. This code combining is performed by decoding the received signal using data bits gathered over a plurality of data packets. This is called pure Incremental Redundancy (IR). In practice, combined LA/IR will be used due to hardware and higher layer protocol limitations. In this mode, while IR can take place, the user is allocated the best coding scheme on a regular basis. An example of a communication system employing these techniques is the Enhanced GPRS (EGPRS) which is being introduced in many GSM systems. Further description of EGPRS is available in "EDGE: enhanced data rates for GSM and TDMA/136 evolution "by Furuskar, A.; Mazur, S.; Muller, F.; Olofsson, H. in IEEE Personal Communications; Volume: 63, June 1999.

In such wireless data packet systems it is essential that data packets or messages are communicated reliably but with the minimum of resource requirement. For example in a GSM system, it is desirable to communicate at high channel data rates and therefore low levels of coding but at the lowest possible power level to reduce interference.

In a multi-code packet data system such as GPRS, the code allocation algorithm is the central point of optimising the throughput and delay of a user and the system as a whole. Link adaptation is the process of selecting the best coding scheme that satisfies a target performance based on the prevailing channel conditions. However, inaccuracies in the channel estimate prevent the selection of the optimum code, which results in imperfect link adaptation.

Consequently these known systems are wasteful in terms of resource utilisation and an improved system for transmitting data is therefore desired.

SUMMARY OF THE INVENTION

The invention seeks to provide an improvement in the performance and resource utilisation of a radio communication.

Accordingly, there is provided a method of transmitting data in a radio communication system comprising the steps of: segmenting data into data segments; encoding the data segments into transmission blocks in accordance with a transmission scheme selected from a transmission protocol comprising a plurality of transmission schemes having different energy per information bit levels; transmitting said transmission blocks over a radio communication channel; determining an analysis group of data segments such that the analysis group comprises at least two data segments having transmission blocks encoded according to different transmission schemes with different energy per information bit levels; receiving feedback information relating to the analysis group; determining a performance distribution measure relating to the analysis group in response to the feedback information; and selecting a transmission scheme from the transmission protocol for at least one subsequent data segment in response to the performance distribution measure.

Preferably the plurality of transmission schemes having different energy per information bit levels employ different error correcting codes, different transmission power levels, different order channel symbols, different channel symbol duration and/or spread spectrum modulation having different spreading codes.

According to a feature of the invention the step of determining the performance distribution measure comprises weighting the feedback information of each data segment within the analysis group in response to the time interval since the data segment was transmitted and the step of selecting a transmission scheme from the transmission protocol for at least one subsequent data segment comprises selecting the transmission scheme that the performance distribution measure indicates will achieve a given error performance.

According to another feature of the invention, transmission schemes for a plurality of subsequent data segments are chosen to provide an energy per information bit variation distributed around an energy per information bit value determined in response to the performance distribution measure.

In accordance with a second aspect of the invention there is provided an apparatus for transmitting data in a radio communication system comprising: means for segmenting data into data segments; means for encoding the data segments into transmission blocks in accordance with a transmission scheme selected from a transmission protocol comprising a plurality of transmission schemes having different energy per information bit levels; means for transmitting said transmission blocks over a radio communication channel; means for determining an analysis group of data segments such that the analysis group comprises at least two data segments having transmission blocks encoded according to different transmission schemes with different energy per information bit levels; means for receiving feedback information relating to the analysis group; means for determining a performance distribution measure relating to the analysis group in response to the feedback information; and means for selecting a transmission scheme from the transmission protocol for at least one subsequent data segment in response to the performance distribution measure.

BRIEF DESCRIPTION OF THE DRAWINGS

An embodiment of the present invention is described below, by way of example only, with reference to the Drawings, in which.

DETAILED DESCRIPTION OF A PREFERRED EMBODIMENT

Figure 1:
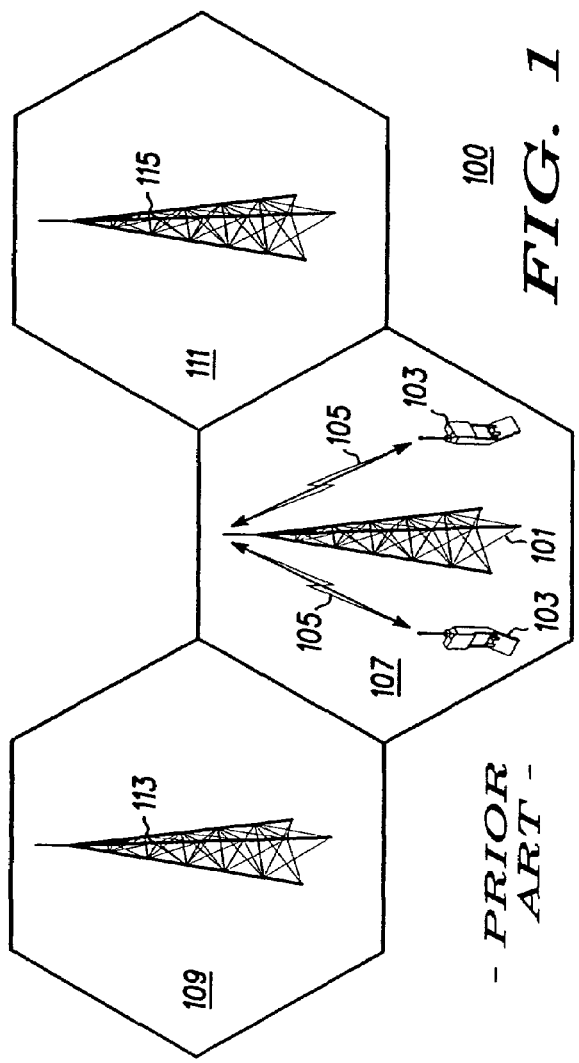
FIG. 1 is an illustration of a cellular communication system according to prior art.
Figure 2:
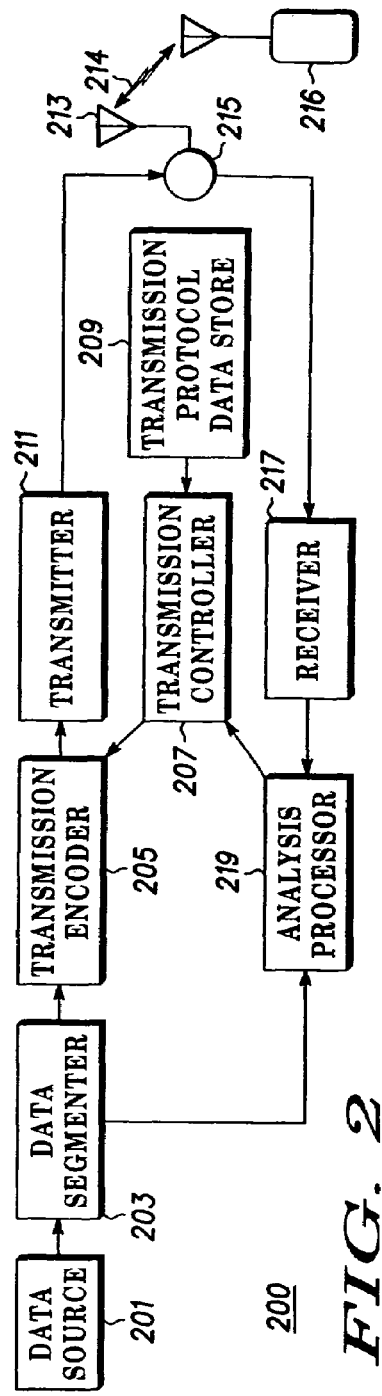
FIG. 2 is an illustration of an apparatus for transmission of data in accordance with an embodiment of the invention.

FIG. 2 illustrates an apparatus 200 for transmission of data in accordance with an embodiment of the invention.

The apparatus receives data from a data source 201 which typically is an external data source. The data source 201 may be any suitable source for producing data such as e.g. a voice encoder, a remote computer terminal, or a video encoder. The data is represented by a string, sequence or stream of information bits at a given data rate.

The data is received by a data segmenter 203 which segments the data into data segments each containing a given number of information bits. Each of these data segments will be transmitted in a separate data packet or transmission block. Typically, each data segment is transmitted in a single data packet but in some embodiments a data segment may be transmitted in a multiple packets. The number of data bits contained within each data segment will depend on the system design of the communication system taking into consideration parameters such as throughput, delay, transmission reliability etc. Typically the number of information bits in each data segment is predetermined and identical for all data segments but in some embodiments it may be dynamically varied and/or be different for different data segments or transmission blocks.

The data segments are fed to a transmission encoder 205 which formats the data segments for transmission over a radio channel 214. This formatting is performed under the control of a transmission controller 207 operably coupled to the transmission encoder 205. The transmission controller 207 is connected to a transmission protocol data store 209 which comprises a number of preset transmission schemes.

The transmission encoder 205 formats the data segments for transmission in accordance with the transmission scheme selected by the transmission controller from the transmission protocol data store 209. This transmission scheme includes a preset value for one or more of the following parameters:

- A modulation scheme: Different transmission schemes may have different modulation schemes such that for example one transmission scheme may use Phase Shift Keying whereas another system may use spread spectrum or Quadrature Amplitude Modulation (QAM). The energy per information bit may be different for different modulation schemes.
- A channel symbol order: Different transmission schemes may also use different orders of the channel symbols. Thus if QAM is used, one transmission scheme may employ BPSK (Binary Phase Shift Keying) or QPSK (Quaternary Phase Shift Keying) whereas other schemes may use e.g. 64-QAM (wherein a channel symbol corresponds to 8 channel bits)
- An error correcting code: Different error correcting codes may be used in different transmission schemes. In a typical error correcting scheme each information bit is coded into a plurality of channel bits. A 1/2 coder will generate two channel bits for each information bit and a 1/3 rate coder will generate three channel bits per information bit. Specifically, some transmission schemes may use no error correcting coding.
- A spreading factor or code: For spread spectrum modulation the spreading factor may be different in different transmission schemes.
- A channel data rate or bit duration: Different transmission schemes may have different channel data rates or bit durations. For example, one transmission scheme may use a 64 kbps channel bit rate whereas another transmission scheme may specify a 128 kbps data rate.
- Transmission power: The power at which the signal is transmitted may be different for different transmission schemes.

The transmission schemes have different settings for one or more of these parameters and by selecting a transmission scheme, suitable parameters for transmission under the current radio propagation conditions can be chosen. Specifically, at least some of the transmission schemes will have different energy per information bit levels. A data segment will have a certain number of data bits N. This data segment will, dependent on the effective transmission time of the transmission blocks for that segment T and the transmission power P, have an effective energy per information bit of $$E_{InfBit} = \frac{P \cdot T}{N}$$

As is well known in the art, the energy per information bit may thus be varied in different transmission schemes by e.g. having different transmit powers, different channel bit durations, different error coding schemes (for a higher rate code, more channel symbols are sent per information bit thereby increasing the energy per information bit for a constant channel bit duration), different order channel symbols (for higher order symbols more channel bits are transmitted by a single symbol thereby reducing the energy per channel bit and thus energy per information bit for constant symbol duration, error coding etc). Generally, the error performance improves for higher energy per information bit values and therefore by having different transmission schemes with different energy per information bit values, it is possible to control the error performance in response to the prevailing radio propagation conditions by dynamically selecting a suitable transmission scheme.

The transmission encoder 205 is operably coupled to a radio transmitter 211 which transmits the transmission blocks to a remote radio station 216 over a radio interface 214. The transmitter 211 is connected to an antenna 213 through a duplexer 215 allowing both a receiver 217 and transmitter 211 to be connected to the same antenna, as is well known in the art. It will be clear that the exact division of functionality between the transmission encoder 205 and the transmitter 211 can be different in different embodiments and specifically they may be implemented as a single integrated functional unit. In the preferred embodiment, the transmission encoder 205 generates the channel data for the transmission blocks by adding headers, training sequences, forward error correcting coding interleaving etc whereas the modulation, frequency translation and amplification is performed in the transmitter 211.

The antenna 213 is through the duplexer connected to a receiver 217 operable to receive messages from the remote radio station 216. The receiver 217 is connected to an analysis processor 219. The analysis processor 219 is also connected to the data segmenter 203, the transmission encoder 205 and the transmission controller 207 and is operable to control the transmission of transmission blocks in response to feedback information received from the remote radio station 216 as will be described in the following.

Figure 3:
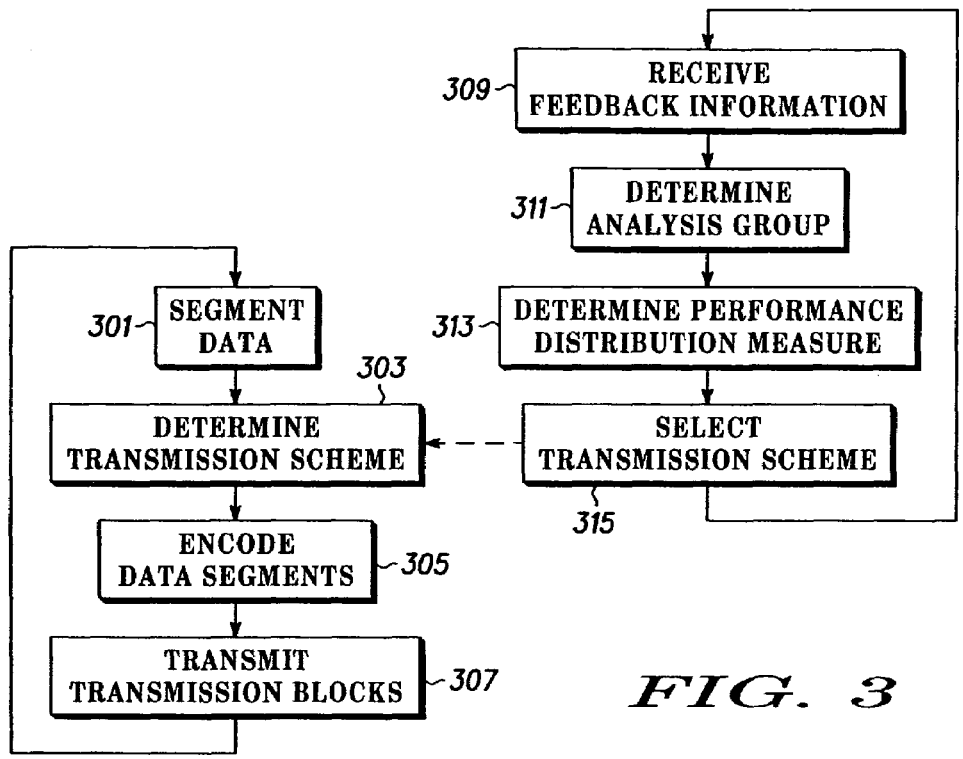
FIG. 3 is an illustration of a flowchart of a method of transmitting data in accordance with an embodiment of the invention.

FIG. 3 is an illustration of a flowchart of a method of transmitting data in accordance with an embodiment of the invention. The figure illustrates the performance of the apparatus of FIG. 2 in the preferred embodiment.

FIG. 3 illustrates an embodiment with two parallel flows interacting with one another. In step 301 the data segmenter 203 receives data from the data source 201 and segments it into a number of data segments.

In step 303 the transmission encoder 205 determines the transmission schemes which are to be used for the transmission. In the preferred embodiment one transmission block is transmitted for each data segment and the transmission scheme for each data segment is determined in step 303. The transmission scheme is chosen so that a given error performance can be expected for the transmission. However, the transmission schemes are not chosen for each transmission block independently. Rather the transmission schemes are chosen such that for a plurality of transmission blocks the energy per information bit will vary. Specifically, in the preferred embodiment transmission schemes are used having identical parameter values except for different forward error correcting codes (FEC) being used. In this embodiment, the transmission schemes will be chosen such that some transmission blocks will use a FEC scheme having very low bit error probability whereas other transmission blocks will use codes having a significantly higher bit error rate. The transmission schemes are chosen such that some transmission blocks will have FEC expected under the given radio propagation conditions to result in error performances much better than required whereas other transmission blocks have FEC schemes expected to result in error performance worse than required.

A significant problem in link adaptation systems is that the performance relies heavily on the estimates of the radio channel conditions and as the radio propagation condition changes, known link adaptation systems can only slowly detect and follow this change as feedback from the receiving radio station inherently will be delayed resulting in a slow control loop performance.

In the current embodiment, a plurality of data segments are transmitted having different energy per information bit levels and thus different error performances. Consequently, rather than transmitting transmission blocks having an error performance given by the current operating point the transmission blocks represent a distribution of error performances around the operating point. As a result, the information pertaining to the current radio channel conditions is much improved and the transmission blocks provide a much better means for probing the channel.

The overall performance of the communication is assured by employing a automatic repeat request scheme such that the remote radio station 216 requests retransmission of packets, which have not been received with an acceptable error performance. The selection of the transmission schemes are made such that the variation of the FEC performance is sufficient to provide a good measure of the channel conditions yet an acceptable overall error performance is obtained. Preferably, this is done by dynamically updating the selection of transmission schemes in response to the number of repeat transmission requests received from the remote stations. As a specific example, if too many transmission repeat requests are received the distribution of the transmission schemes around the operating point is changed so that fewer transmission blocks with bad performance and more with better performance are transmitted.

Based on the selection of the appropriate transmission schemes, the data segments are encoded into appropriate transmission blocks in step 305 and are transmitted in step 307. The flow of these four steps 301, 303, 305 and 307 then iterates.

Upon receiving a transmission block corresponding to a data segment, the remote radio station 216 evaluates the error performance and generates feedback information, which is then transmitted back to the apparatus for transmission. This feedback information maybe any information relating to the reception of the transmission blocks which allows the apparatus for transmission to derive information about the communication performance of the communication link. In the preferred embodiment, the information is simply the ACK/NACK status of each transmission block received, and in this embodiment whenever the remote radio station receives a transmission block it determines its ACK/NACK status and sends a message back to the apparatus for transmission.

In step 309 the receiver 217 receives the feedback information from the remote radio station.

In step 311 an analysis group is determined. It is within the contemplation of the invention that any suitable selection of analysis group can be determined. In the preferred embodiment, the analysis group is simply determined as the last N data segments, but in more complicated embodiments more complex selections may be employed including dynamically changing the number of data segments included. Specifically, analysis groups may be overlapping such that individual data segments may belong to more than one analysis group.

In step 313, the analysis processor determines a performance distribution measure. This performance distribution measure relates to the error performance for a range of different energy per information bit levels. The distribution measure is determined by comparing the feedback information in relation to the transmission scheme which was used. Hence, in its simplest form the analysis processor groups all data segments in the analysis group using the same transmission scheme together and derives an average error performance from the ACK/NACK status of each data segment reported in the feedback information. This is repeated for all transmission schemes used within the analysis group and thereby a number of discrete measurement points in an error performance distribution versus energy per information are derived. If further granularity or an extended range is required this can be obtained by interpolation and/or extrapolation using for example curve fitting techniques as is well known in the art.

Figure 4:
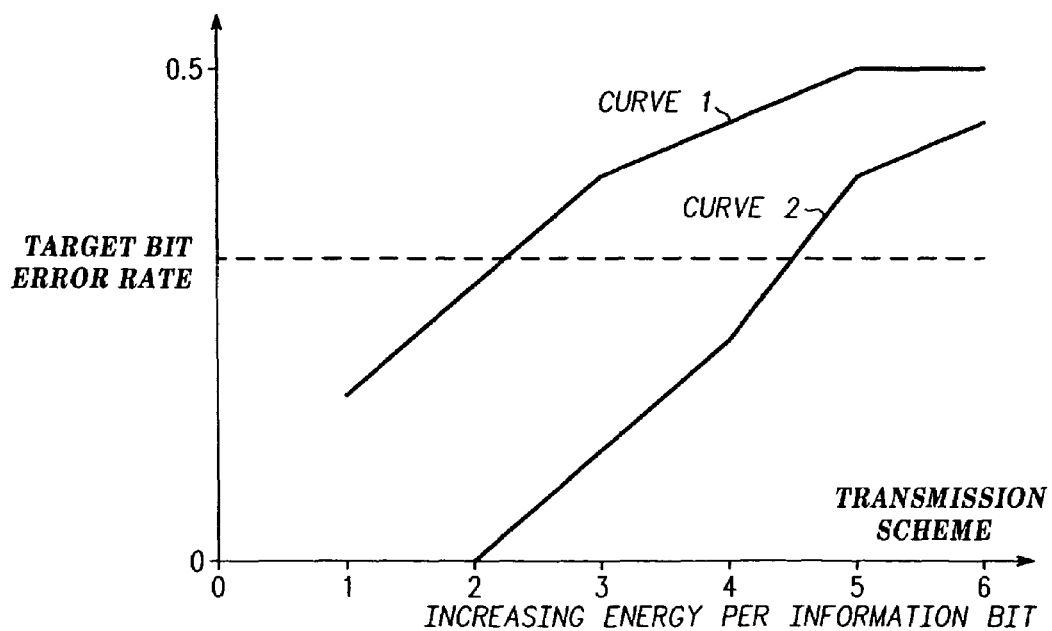
FIG. 4 illustrates an example of a performance distribution measure in accordance with an embodiment of the invention.

FIG. 4 illustrates an example of a performance distribution measure in accordance with an embodiment of the invention. In the example, 6 transmission schemes are used within an analysis group with transmission scheme 1 having the highest energy per information bit and transmission scheme 6 the lowest. The figure shows two example performance distribution measures which may be derived. In the first example, Curve 1 shows a situation where the propagation characteristics are worse than expected and in the second example, curve 2 shows a situation where the propagation characteristics are better than expected. As a specific example, the performance distribution measure may have been determined based on an analysis group of 20 data segments comprising 5 data segments encoded by transmission scheme 3, 5 data segments by scheme 4, 3 segments by scheme 2 and 5 respectively and 2 data segments by scheme 1 and 6 respectively.

In example one only transmission schemes 1 and 2 where found to give a performance that met the target information bit error rate whereas the other transmission schemes have bit error rates much higher than the target error rate. Specifically transmission scheme 5 and 6, which have very little and no forward error correcting coding respectively, have resulted in a bit error rate of 0.5 i.e. with loss of all information. Hence, the operating point during this analysis group should ideally have been moved towards the lower number transmission schemes in order to achieve an overall bit error rate below the target bit error rate.

In example two, transmission schemes 1 to 4 exhibit performance below the target whereas transmission schemes 5 and 6 are slightly above the target threshold. As a consequence the overall achieved bit error rate is much below the target bit error rate and specifically transmission scheme 1 and 2 employ so powerful error correcting coding that there are no bit errors at all. Hence, although the bit error rate is below the target bit error rate the communication is wasteful in terms of resource as the higher numbered transmission schemes have a higher throughput of information bits due to the reduced redundancies imposed by the error coding.

In step 315 transmission schemes for at least one subsequent data segment and, thus for the transmission block or blocks of that data segment, is determined in response to the error distribution determined in step 313. In the preferred embodiment, a plurality of transmission schemes are chosen to be used at a frequency dependent on the error performance distribution. Thus if the performance distribution shows a performance which indicates that transmission schemes expected to not provide sufficient performance in fact have acceptable performance due to the change in propagation conditions, the usage of these transmission schemes will increase. Similarly, if transmission schemes expected to provide acceptable performance do not do so, the use of transmission schemes having higher signal energy per information bit will increase.

In the example of curve 1 of FIG. 4, the performance distribution measure indicates that a higher percentage of the lower number transmission schemes must be used than for the analysis group measured. As an example it may therefore for a subsequent group of 20 segments be determined that 3 data segments should use scheme 1, 6 segments use scheme 2, 6 segments use scheme 3, 3 segments use scheme 4 and that there should be one data segment using scheme 5 and one segment using scheme 6. Hence, if the radio channel conditions do not change significantly, a much better performance achieving the overall bit error rate is obtained. At the same time, by using a distribution of transmission schemes, the probing of the channel and the information obtained pertaining to channel changes is much improved. Thus if the radio propagation conditions change such that no coding is necessary the data segments using schemes 5 and 6 will unexpectedly be received with good performance thereby indicating that a large change in the selection of transmission schemes is required.

In the example, corresponding to Curve 2 of FIG. 4, the distribution may be changed to selecting 6 data segments for each of transmission schemes 4 and 5, 3 data segments for each of scheme 3 and 6 and one for each of transmission scheme 1 and 2. This will result in increased throughput for unchanged conditions yet still provide a distribution permitting efficient probing or sounding of the channel.

The step of determining a transmission scheme 303 for a data segment is thus controlled by the step of selecting transmission schemes 315 in that the latter step determines a distribution of the transmission schemes which is implemented by the selection of transmission schemes being determined to achieve the given distribution.

In the preferred embodiment the step of determining the performance distribution measure comprises weighting the feedback information for each data segment within the analysis group in response to the time interval since the data segment was transmitted. In accordance with this embodiment the performance of data segments transmitted early in the analysis group transmission interval is weighted relatively lower than the performance of data segments transmitted recently.

It will be clear that arrangements other than two parallel flows as shown in FIG. 3 are equally applicable, such as a single sequential flow, a plurality of synchronised flows or asynchronous flows. Hence any suitable timing and order the steps may be used without detracting from the invention. Specifically, the operations of setting of the transmission parameters, receiving feedback information and performing the analysis as well as the time and duration of an analysis group may be performed at any suitable time. Hence each operation may be timed independently of all other operations or may be dependent and synchronised with the other operations.

Hence in one extreme, a strict correlation between the operations may be applied such that an analysis group is defined as a specific set of data segments. As soon as these data segments are received by the remote radio station 216, feedback information relating to the performance of this specific set is generated by the remote radio station 216 and sent back to the apparatus for transmission 216. Upon receiving this information, the analysis is performed immediately and based on the analysis, transmission schemes are selected for a new analysis group comprising a new set of data segments immediately following the previous set of data segments.

In the other extreme, data segments may be transmitted continuously without consideration of the timing of any analysis by the transmission controller 205 selecting transmission schemes based on a current setting. The feedback information may be received from the remote radio station 216 in an ad-hoc semi random manner where the radio station independently determines when to send feedback information. This feedback information may simply be stored in the apparatus when received. The analysis processor may independently of these activities select a time for performing a new analysis. This could for example be at regular intervals or could be determined by other external factors such as when the apparatus has available processor resource for performing the analysis. The analysis processor would initiate the analysis by selecting a given analysis group of data segments. The timing and duration of the analysis group may be completely independent of the transmission of data segments, the receipt of feedback information and the timing of the analysis. In one embodiment, it may be determined based on how much available processor resource the apparatus currently has available such that the more processor resource available the larger the analysis group. The analysis processor will initially retrieve data relating to the transmission schemes used for the data segments of the analysis group as well as any feedback information received relating to those data segments. Based on this data, the analysis processor will perform the analysis and the result will be fed to the transmission controller 207 which in response thereto modifies the current rule applied for selecting transmission schemes thereby modifying the transmission characteristics for the transmission of transmission blocks. The modified rule will then be applied until a new analysis is performed which may be sooner or later for example dependent on external factors such as available processor resource.

The components and functionality described may be implemented in any suitable manner to provide suitable apparatus. Specifically, the components may consist of a single discrete entity, or may alternatively be formed by adapting existing parts or components. As such the required adaptation may be implemented in the form of processor-implementable instructions stored on a storage medium, such as a floppy disk, hard disk, PROM, RAM or any combination of these or other storage media. Furthermore, the functionality may be implemented in the form of hardware, firmware, software, or any combination of these.

It will be understood that the invention tends to provide the following advantages singly or in any combination:

a very efficient resource utilisation is possible as the selection of transmission schemes can be chosen to provide satisfactory performance under fast changing radio propagation conditions as a performance distribution is measured rather than performance at a single operating point.

a very efficient and fast estimation of the channel propagation characteristics can obtained as a plurality of transmission schemes having different energy per information bit levels are used.

The invention claimed is:

1. A method of transmitting data in a radio communication system comprising the steps of:

segmenting data into data segments;

encoding each of the data segments into transmission blocks in accordance with a transmission scheme selected from a transmission protocol comprising a plurality of transmission schemes having different levels of energy per information bit to provide an energy per information bit distribution;

transmitting said transmission blocks over a radio communication channel;

determining an analysis group of data segments such that the analysis group comprises at least two data segments having transmission blocks encoded according to different transmission schemes with different levels of energy per information bit;

receiving feedback information relating to the analysis group;

determining a performance distribution measure of a channel relating to the analysis group in response to the feedback information by probing the channel at a plurality of error performance levels; and selecting a transmission scheme from the transmission protocol for at least one subsequent data segment to provide an energy per information bit variation distributed around an energy per information bit value in response to the performance distribution measure.

2. The method of transmitting data as claimed in claim 1 wherein the plurality of transmission schemes having different levels of energy per information bit employ different error correcting codes.

3. The method of transmitting data as claimed in claim 1 wherein the plurality of transmission schemes having different levels of energy per information bit employ different transmission power levels.

4. The A method of transmitting data as claimed in claim 1 wherein the plurality of transmission schemes having different levels of energy per information bit employ different order channel symbols.

5. The method of transmitting data as claimed in claim 1 wherein the plurality of transmission schemes having different levels of energy per information bit employ different channel symbol duration.

6. The method of transmitting data as claimed in claim 1 wherein the plurality of transmission schemes having different levels of energy per information bit employ spread spectrum modulation having different spreading codes.

7. The method of transmitting data as claimed in claim 1 wherein the step of determining the performance distribution measure comprises weighting the feedback information of each data segment within the analysis group in response to a time interval since the data segment was transmitted.

8. The method of transmitting data as claimed in claim 1 wherein the step of selecting a transmission scheme from the transmission protocol for at least one subsequent data segment comprises selecting the transmission scheme that the performance distribution measure indicates will achieve a given error performance.

9. The method of transmitting data as claimed in claim 1 wherein the steps are iterated and at least two analysis groups are overlapping.

10. The A method of transmitting data as claimed in claim 1 wherein the radio communication system is a General Packet Radio System (GPRS), an Enhanced General Packet Radio System (EGPRS) or a Universal Mobile Telecommunication System (UMTS).

11. An apparatus for transmitting data in a radio communication system comprising:

means for segmenting data into data segments;

means for encoding each of the data segments into transmission blocks in accordance with a transmission scheme selected from a transmission protocol comprising a plurality of transmission schemes having different levels of energy per information bit to provide an energy per information bit distribution;

means for transmitting said transmission blocks over a radio communication channel;

means for determining an analysis group of data segments such that the analysis group comprises at least two data segments having transmission blocks encoded according to different transmission schemes with different levels of energy per information bit;

means for receiving feedback information relating to the analysis group;

means for determining a performance distribution measure of a channel relating to the analysis group in response to the feedback information by probing the channel at a plurality of error performance levels; and means for selecting a transmission scheme from the transmission protocol for at least one subsequent data segment to provide an energy per information bit variation distributed around an energy per information bit value in response to the performance distribution measure.

12. The apparatus for transmitting data as claimed in claim 11 wherein the plurality of transmission schemes having different levels of energy per information bit employ different error correcting codes.

13. The apparatus for transmitting data as claimed in claim 11 wherein the plurality of transmission schemes having different levels of energy per information bit employ different transmission power levels.

14. The apparatus for transmitting data as claimed in claim 11 wherein the plurality of transmission schemes having different levels of energy per information bit employ different order channel symbols.

15. The apparatus for transmitting data as claimed in claim 11 wherein the plurality of transmission schemes having different levels of energy per information bit employ different channel symbol duration.

16. The apparatus for transmitting data as claimed in claim 11 wherein the plurality of transmission schemes having different levels of energy per information bit employ spread spectrum modulation having different spreading codes.

17. The apparatus for transmitting data as claimed in claim 11 wherein the means for selecting a transmission scheme from the transmission protocol for at least one subsequent data segment comprises means for selecting the transmission scheme that the performance distribution measure indicates will achieve a given error performance.

18. The apparatus for transmitting data as claimed in claim 11 wherein the radio communication system is a General Packet Radio System (GPRS), an Enhanced General Packet Radio System (EGPRS), or a Universal Mobile Telecommunication System (UMTS).

* * * * *